Dec. 20, 1966     O. DAHLE     3,292,429
MEANS FOR MEASURING MECHANICAL FORCES
Filed Feb. 4, 1964     4 Sheets-Sheet 1
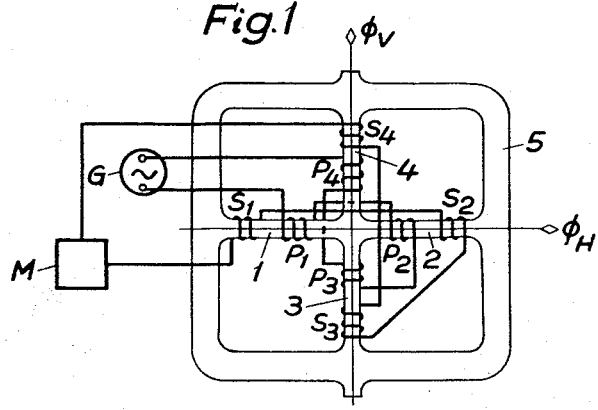
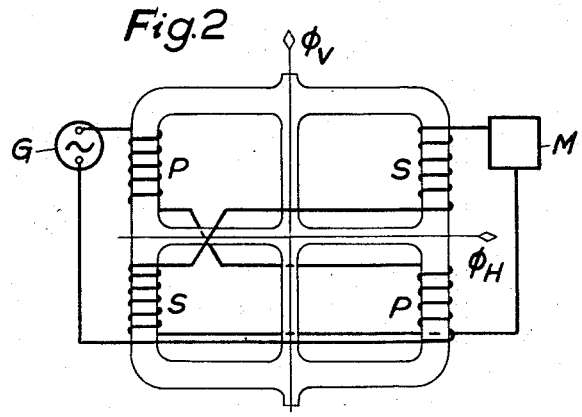
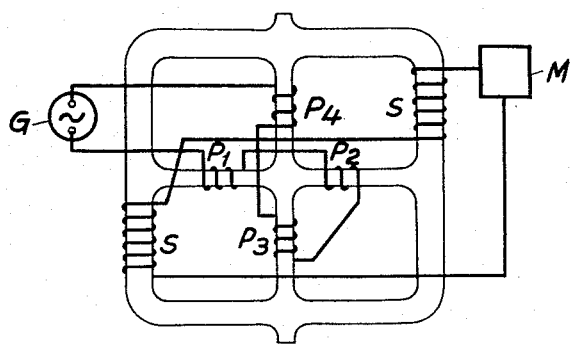
INVENTOR.
ORVAR DAHLE
BY Bailey, Stephens & Huettig Dec. 20, 1966  O. DAHLE  3,292,429
MEANS FOR MEASURING MECHANICAL FORCES
Filed Feb. 4, 1964  4 Sheets-Sheet 2
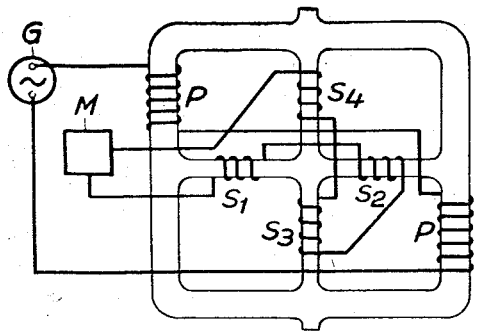
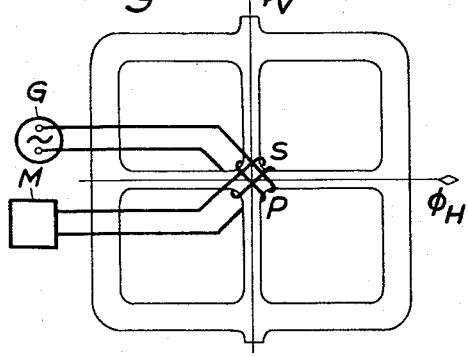
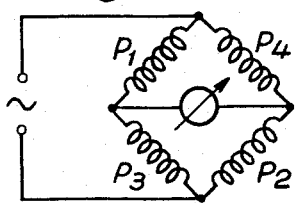
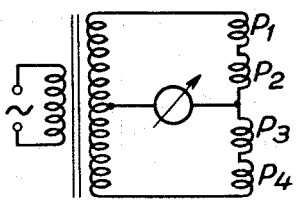
INVENTOR.
ORVAR DAHLE
BY Bailey, Stephens & Huettig Dec. 20, 1966   O. DAHLE   3,292,429
MEANS FOR MEASURING MECHANICAL FORCES
Filed Feb. 4, 1964   4 Sheets-Sheet 3
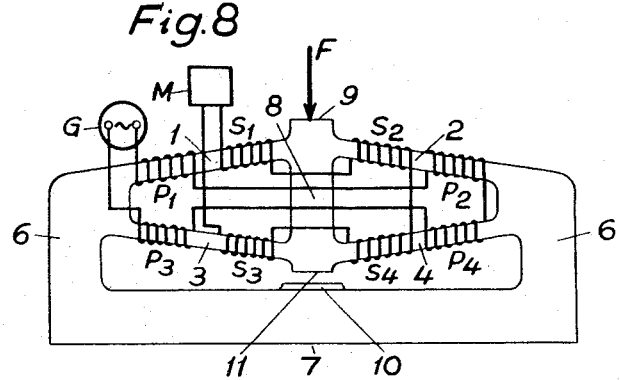
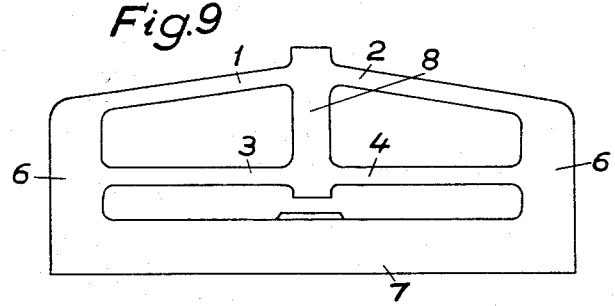
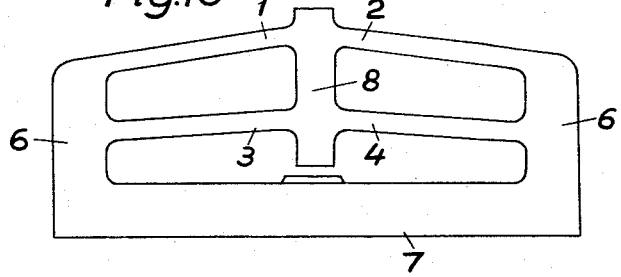
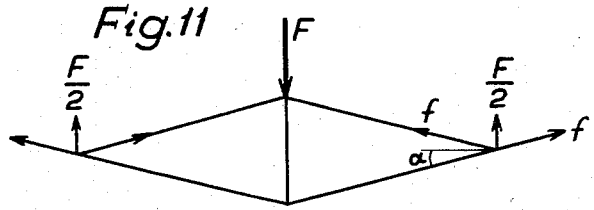
INVENTOR.
ORVAR DAHLE
BY Bailey, Stephens & Huettig Dec. 20, 1966  O. DAHLE  3,292,429
MEANS FOR MEASURING MECHANICAL FORCES
Filed Feb. 4, 1964  4 Sheets-Sheet 4
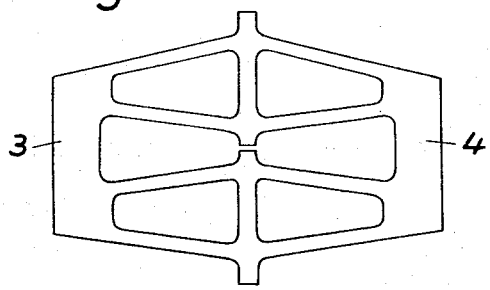
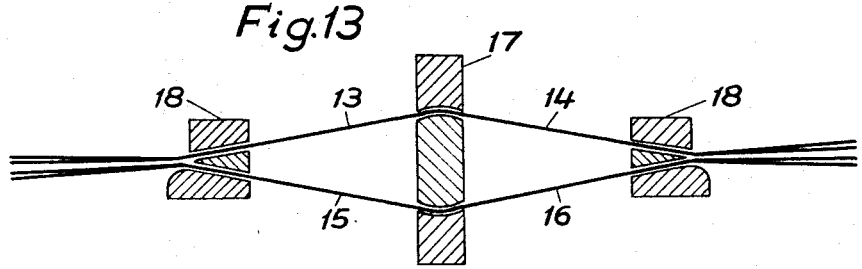
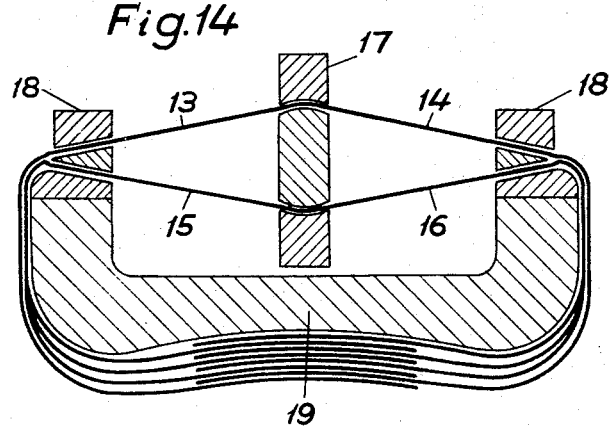
INVENTOR.
ORVAR DAHLE
BY Bailey, Stephens & Huettig United States Patent Office 3,292,429
Patented Dec. 20, 1966

3,292,429
MEANS FOR MEASURING MECHANICAL FORCES
Orvar Dahle, Vasteras, Sweden, assignor to Allmanna Svenska Elektriska Aktiebolaget, Vasteras, Sweden, a corporation of Sweden
Filed Feb. 4, 1964, Ser. No. 342,463
Claims priority, application Sweden, Feb. 13, 1963, 1,549/63
13 Claims. (Cl. 73—141)

Since several decades ago magnetoelastic properties of certain materials have been used in measuring mechanical forces and several different types of magnetoelastic measuring devices have been produced. In one of these types the measuring device consists of one or more inductive elements with a core of magnetostrictive material and a current traversed winding, the inductance of the measuring device being changed when actuated by a mechanical force. The inductance change is taken as a measure of the actuating force and the measurement takes place electrically. If only one measuring device is used, the inductance change is measured in some known way and is supplied to a measuring instrument possibly after amplification. With the use of several measuring devices, these may be combined in a framework construction with certain measuring devices under tension and others compressed. The inductive elements are then often connected in a bridge and the size of the unbalance voltage obtained from the bridge corresponds to the actuating force. The characteristic for these measuring devices is that the measurement is carried out electrically by measuring devices connected as elements in current fed bridge connections of different kinds. Such measuring devices are known through, for example, the German Patents 715,232 and 740,762.

Another type of force actuated magnetoelastic measuring device consists of a body of laminated magnetostrictive material. The measuring device has an exciting winding which is connected to an alternating voltage source, and a measuring winding which is connected to a measuring means. When the body is actuated by a mechanical force its magnetic properties change depending on the size and direction of the applied force. The size and direction of the magnetic field is thereby also changed in different parts of the body. The measuring winding senses the magnetic unbalance which arises and the voltage induced in the measuring winding constitutes a measure of the size of the force. The task of the exciting winding is to supply the magnetoelastic body with magnetomotive force and thus to generate a magnetic flux of a certain aspect in the body. The task of the measuring coil is to sense the change of this flux which arises when the body is subjected to the influence of a mechanical force. A measuring device of this kind works thus according to quite another principle from that of the first-mentioned. Swedish Patent 151,267 shows an embodiment of such a measuring device.

In the last-mentioned measuring device the two windings are so arranged in holes in the body that they cross each other outside the body. This arrangement of the windings means that they must be put in place by hand. The crossing of the windings outside the body may in certain cases have the disadvantage that it takes up a large space in the lateral direction.

The present invention relates to a construction of the windings so that, if it is found desirable, they may be made mechanically. With this system the same winding construction may be used as for transformers if the parts of the measuring device which support the windings are made relatively extended and with constant, substantially square cross-section. The parts or legs of the core which support the windings are preferably made relatively long, partly in order to have space for windings with large copper area and partly, if desired, to obtain space for both exciting and measuring windings on the same leg. Another advantage with this type of winding is that it is well suited for balancing the first harmonic in a possible unbalance voltage through the fact that one can have different numbers of revolutions for the windings, perpendicular to each other, in the exciting or measuring windings. The invention is characterized in that the measuring body is composed of a magnetic bridge, consisting on the one hand of a measuring zone built up of four parts formed as legs or braces which are arranged to be subjected to different components of the force which shall be measured, and on the other hand a diagonal part which constitutes a part of the flux path for the magnetic fluxes running through the legs, at least two of said parts with different magnetic fluxes at least upon loading of the measuring device being each surrounded by at least one winding for generating and/or sensing the magnetic flux in this part.

On the accompanying drawings FIGURE 1 shows a measuring device which is provided with windings of the type which is described above. FIGURES 2, 3 and 4 show alternative placing of primary and secondary windings. FIGURE 5 shows how the same flux distribution may be obtained with a single winding according to the Swedish Patent 151,267. In FIGURES 6 and 7 are shown different connecting possibilities for the primary windings of the measuring device when only such windings are used. FIGURES 8, 9, 10 and 12 show another embodiment of the iron core of a measuring device with the proposed type of winding, while FIGURE 11 shows the force distribution for such a measuring device. FIGURES 13 and 14 finally show a measuring device where the iron core is made of steel strip.

In the embodiment of the invention shown in FIGURE 1 the magnetic bridge consists of four parts in the form of braces 1, 2, 3 and 4 which are arranged to form a right-angle cross. The outer ends of the cross are held together by a rectangular frame part 5, which constitutes a necessary part of the flux path for the magnetic fluxes in the bridge parts 1, 2, 3 and 4. The magnetic fluxes in the magnetic bridge consisting of the braces are generated with the help of four series-connected windings $P_1$, $P_2$, $P_3$ and $P_4$, which are arranged one on each arm of the cross and connected to an alternating current source G. The windings $P_1$ and $P_2$ generate a horizontal flux $\phi_H$ in the horizontal part of the cross formed by the braces 1 and 2, while the windings $P_3$ and $P_4$ generate an equally large vertical flux $\phi_V$ in the other part of the cross. The fluxes are closed through the outer holding frame 5. In the first and third quadrant the two fluxes are oppositely directed and in unloaded measuring devices the algebraic sum of the two fluxes is thus zero. In the second and fourth quadrant the fluxes are in the same direction and the resulting flux is the sum of the two fluxes. The magnetic fluxes in the magnetic bridge are sensed by four secondary windings $S_1$, $S_2$, $S_3$ and $S_4$. These windings are connected together in a series-connection with $S_1$ and $S_2$ in the same direction as $P_1$ and $P_2$, and $S_3$ and $S_4$ in the opposite direction to $P_3$ and $P_4$ and connected to a measuring device M. In unloaded measuring devices the resulting induced voltage in the secondary windings is therefore zero. When the measuring device is loaded with a vertical pressure $\phi_V$ decreases and a voltage which corresponds to $\phi_H - \phi_V$ is obtained from the secondary windings.

Since the fluxes $\phi_V$ and $\phi_H$ are directed in the four quadrants of the outer frame 5 so that they cooperate in the second and fourth quadrants and counteract each other in the first and third it is seen that the windings for generating and sensing of the magnetic fluxes may be arranged also around the frame 5 as shown in FIGURE 2. It is thus possible to place the exciting windings P around the frame in the second and fourth quadrants or in only one of them. In the latter case, however, the sensitivity of the measuring device is lowered. The measuring windings S may in a similar way be placed around the frame in the first and third quadrants or in only one of them.

It is thus possible to generate and sense magnetic fluxes either by placing the windings intended for this around the arms of the cross which is formed of the braces 1, 2, 3 and 4 or around the frame 5 at different points on this. It is seen, however, that a combination of both the winding methods is also possible, since the flux paths in the measuring device to a certain extent are independent of the positioning of the windings. It is therefore feasible to place the exciting windings P around the arms of the cross and the measuring windings around the frame 5 according to FIGURE 3 or vice versa according to FIGURE 4. Which positioning is to be preferred in a certain case depends on various factors. In the first-mentioned winding arrangement with all windings around the arms of the cross the windings will lie completely inside the frame 5. In a certain opening of the measuring device, for example the upper right, half the windings $P_2$, $S_2$, $P_4$ and $S_4$ will then lie and this means that the space for the windings is relatively limited. In the other extreme case with all windings around the frame 5 the same opening of the frame will be taken up by only one winding. The winding space is in this case considerably greater. It is essential for all winding arrangements that the exciting windings should surround the sum flux of $\phi_H$ and $\phi_V$, while the measuring windings should surround the differential flux of $\phi_H$ and $\phi_V$.

The flux distribution which is obtained with the winding system according to FIGURE 1 may also be obtained with a single winding P as is shown in FIGURE 5. Likewise the flux changes as a result of mechanical force influence in the measuring device could be sensed with a single winding S.

It is also possible to eliminate the secondary windings and use only the primary windings. These could then be connected in a bridge, as shown in FIGURE 6, or in differential connection according to FIGURE 7. In the latter case the correct zero compensation for the first harmonic can be found for example by means of a suitable terminal on the differential transformer.

The similarity between the measuring means according to FIGURES 6 and 7 and the electrical bridge connection mentioned in the introduction of the specification is superficially rather large. In order to understand the present invention it is necessary to realize that it is not the inductances in the coils $P_1$–$P_4$ which are measured, which is the case in an electrical bridge connection. The invention works with a purely magnetic bridge which is only sensed electrically. This essential difference is most evident from the fact that the different coils $P_1$–$P_4$ in FIGURES 6 and 7 are magnetically connected to each other, which is not the case in the known electrical bridge connections. Another assumption in order that measuring with a magnetic bridge according to the invention may take place is that there is a common return path of the magnetic fluxes from two differently loaded braces, which does not occur in the known electrical bridge connections.

With the embodiment of the measuring body shown in FIGURES 1–5 a measuring device with very high sensitivity is obtained. In order to obtain high sensitivity the largest possible part of the mechanical force flux should be led through the measuring zone and the least possible part through the necessary magnetic return paths. In addition the measuring zone should be made as long as possible at certain maximum height for the measuring device since the output power is proportional to the length of the measuring zone. Both these requirements are well fulfilled by the measuring device shown. Practically the whole force flux goes through the centre pillar since both the bent beams formed by the frame halves have a negligible rigidity. Simultaneously the advantage of a long measuring zone is gained where the force flux and the magnetic flux on a long stretch are homogeneous and mutually parallel. Since the outer frame magnetically only acts as a return path for the flux it should be made as weak as possible on one side but on the other side still have so much larger cross-area than the measuring cross that only a negligible part of the exciting ampere turns is consumed in its outer return paths.

With the proposed winding construction a measuring device with even greater sensitivity can be manufactured. The principle of this measuring device is evident from FIGURES 8–11. The measuring device shown in FIGURE 8 has a framework construction which is built up of four braces 1, 2, 3 and 4, which constitute the legs in a magnetic bridge. Each brace is surrounded by an exciting winding $P_1$, $P_2$, $P_3$, $P_4$ and measuring winding $S_1$, $S_2$, $S_3$ and $S_4$. Two diagonally opposite corners of the construction are connected to each other by means of a U-shaped frame consisting of a horizontal part 7 and two branches 6 perpendicular to branch 7. The two other corners of the construction are connected to a straight beam 8, on the upper end 9 of which the force to be measured is applied. In order to prevent overloading of the measuring device a distance piece 10 may be placed between the lower surface 11 of the beam and the horizontal part 7 of the frame. The main task of the frame is to constitute a return path for a magnetic flux. From the point of view of manufacturing technique it is however suitable to allow the frame also to serve as the mechanical holding element for the framework construction.

The windings $P_1$, $P_2$, $P_3$ and $P_4$ are alike, series connected and connected to an alternating voltage source G. The winding direction is so chosen that the magnetic flux in the upper branch consisting of the parts 1 and 2 is oppositely directed to the flow in the lower branch. The measuring windings $S_1$ and $S_2$ in the upper branch are wound in the same direction as $P_1$ and $P_2$, while the windings $S_3$ and $S_4$ are wound opposite to $P_3$ and $P_4$. Both the magnetic fluxes are closed by means of the frame 6 and 7. When the measuring device is unloaded the fluxes in both the branches are the same and the resulting induced voltage in the windings $S_1$–$S_4$ is zero.

If the measuring device is loaded by a force F applied on the surface 9, the braces 1 and 2 will be compressed and the braces 3 and 4 will be under tension. The reluctance in the two first-mentioned braces increases while it decreases in the other two. Since the magnetomotive force is the same for all the coils the flux in the upper branch will decrease while it increases in the lower branch. The resulting induced voltage in the windings $S_1$–$S_4$ will differ from zero and the measuring instrument M connected to the measuring winding gives a reading which is proportional to the force F.

It is also possible, similar to what is shown in FIGURE 3, to arrange the magnetising windings $P_1$–$P_4$ on the legs in the framework construction and arrange the measuring windings on the frame 6, 7 which is the return path for the fluxes through the measuring zone. In unloaded measuring devices the resulting flux in the frame is zero. Upon loading a differential flux occurs in the frame which is proportional to the activating force. Of course it is also possible in the way shown in FIGURE 4 to place the exciting winding around the frame 6, 7 and the measuring windings around the parts 1, 2, 3 and 4 in the measuring zone.

In order to make the measuring device as sensitive as possible it should be ensured that the reluctance lies substantially in the measuring braces 1–4. The area of the frame should therefore be made relatively large. This has the result that the windings which are placed around it are large. The least material consumption and winding space is obtained therefore with all windings around the braces. It is also possible as is evident from FIGURES 6 and 7 to use the same windings for magnetising and measuring.

In the embodiment of the invention described above it has been assumed that the force is distributed equally between compressed and tensioned elements. It has however been shown that there is not the same linear association between force and electrical output voltage with tensioned and with compressed sensing. It may therefore be desirable to decrease the strain in the tensioned braces possibly right down to zero. In the framework construction this is effected by making the tensioned braces more horizontal so that they are theoretically horizontal upon complete unloading according to FIGURE 9. In practice it is difficult to get the frame completely rigid and in practical embodiments a small curving outwards of the free ends of the branches 6 is obtained when the measuring device is loaded. In order to compensate this curving it may be desirable to give the lower braces such a direction as shown in FIGURE 10. If the longitudinal direction of the braces forms a certain angle with the horizontal plane the braces will upon pressure loading from above on the measuring device be subjected to a certain pressure strain, while they are simultaneously subjected to a substantially equally large tensile strain because of the curving outwards of the branch windings which means that they remain substantially unactivated.

A measuring device of the type shown in FIGURES 8–10 has high sensitivity depending on the fact that a certain increase of the applied force is obtained. The basic principle for the force increasing in a measuring device according to FIGURE 8 is evident from FIGURE 11, the framework being regarded as ideal, i.e. with hinges at the intersections, so that pure bar forces are obtained in the braces. If the beam 8 is influenced by a vertical force F the reaction force at fixing of the braces in the branches 6 is equal to F/2. If the angle between the braces at their fixing in the branches is $2\alpha$ the strain in the braces $=f=F/4 \sin \alpha$. In a construction according to FIGURE 8 however the braces must be regarded as stretched bars fixed at both ends and the force F is no longer supported by the pure compression and tensile forces $f$ but also by a bending moment in the braces. This means varying strain over the cross section of the braces which decreases the linear measuring range. At a certain bar height on the braces the angle $\alpha$ must not be too small, since a decrease of the angle $\alpha$ means that too great a part of the force is transmitted by bending moment in the braces.

FIGURE 12 shows a variation of the measuring device according to FIGURE 8, where the frame which constitutes the return path for the magnetic flux is replaced by a framework construction of the same kind as that used for measuring. The one framework serves then as the return path for the flux in the other.

In the above it has been presupposed that the measuring devices are manufactured by glueing together punched out plate sections with the plane of the plates parallel to the applied force. Because of the requirement for minimum width of the parts of the punched section, which must be dealt with in punching, a certain minimum bending rigidity of the braces is obtained. According to the above the contribution of the bending rigidity to the rigidity of the framework in the force direction should be insignificant. In FIGURES 13 and 14 is shown how a measuring device can be manufactured where the bending rigidity can be decreased even to the limit which is determined by the risk of breaking. The framework is built up of very thin plate strips and the braces 13, 14, 15 and 16 are formed of one or more strips which are laid in guiding slots in a central beam 17 and two side supports 18, which are supported by a stand 19. The magnetic return path is obtained by interleaving the ends of the strips alternately close to the stand and fastening them to this stand in a known way, for example with the help of bandage. In order to make the measuring device stable also in the lateral direction it may be made with two frameworks perpendicular to each other with common central beam and common stand.

I claim:
1. Means for measuring mechanical forces comprising a measuring body of magnetostrictive material and windings on said body for generating and measuring magnetic fluxes in said measuring body, means to transmit the forces to be measured to said body, said measuring body constituting a magnetic bridge having a measuring zone constituted by at least four leg parts and magnetic flux path parts connecting the ends of said leg parts, the arrangement of said leg parts and said flux path parts causing at least two of said parts to be traversed by different fluxes when the mechanical forces to be measured act upon said body, windings surrounding each of at least two of said parts for generating or indicating magnetic fluxes in said parts.

2. Means for measuring mechanical forces according to claim 1, said measuring body being of window shape, said four leg parts being arms of a square angled cross, said flux path parts comprising a quadrangular frame, said frame constituting paths for magnetic fluxes which are the sum of and the difference between the magnetic fluxes in said leg parts.

3. Means for measuring mechanical forces according to claim 2, said windings including an exciting coil on that portion of said frame where it is traversed by the sum of the magnetic fluxes in said leg parts and a measuring coil on that portion of said frame where it is traversed by the difference between the magnetic fluxes in said leg parts.

4. Means for measuring mechanical forces according to claim 2, said windings including exciting coils on the arms of said cross and at least one measuring coil on said portion of said quadrangular frame which is traversed by the difference of the magnetic fluxes in said leg parts.

5. Means for measuring mechanical forces according to claim 2, said windings including exciting coils on at least one arm of said cross, and at least one exciting coil on said portion of said quadrangular frame which is traversed by the sum of the magnetic fluxes in said leg parts.

6. Means for measuring mechanical forces according to claim 1, said leg parts forming a framework having two outer parts, said flux path parts comprising a frame connecting the two outer parts of said framework, said flux path parts constituting a return path for the fluxes in said leg parts.

7. Means for measuring mechanical forces according to claim 6, the arrangement of said leg parts and said flux path parts causing at least two of said leg parts to be loaded in different ways by said force, said windings including exciting coils on each of said differently loaded leg parts and at least one measuring winding on said flux path parts.

8. Means for measuring mechanical forces according to claim 6, said windings including at least one exciting coil on said frame and measuring coils on said differently loaded leg parts.

9. Means for measuring mechanical forces according to claim 1, said windings including a winding surrounding each of at least two leg parts comprising an exciting coil and a measuring coil.

10. Means for measuring mechanical forces according to claim 1, said windings including windings for generating magnetic fluxes surrounding leg parts and being connected as a bridge.

11. Means for measuring mechanical forces according to claim 1, all said parts forming a framework.

12. Means for measuring mechanical forces according to claim 1, said measuring body being a laminated structure composed of sheets of magnetostrictive material insulated from each other and glued together by a synthetic resin.

13. Means for measuring mechanical forces according to claim 1, all said parts consisting of thin strips of magnetostrictive material.

References Cited by the Examiner

UNITED STATES PATENTS 1,906,551 5/1933 DeForest _____ 73—141 X
3,168,830 2/1965 Chass _____ 73—398

FOREIGN PATENTS 1,315,183 12/1962 France.

RICHARD C. QUEISSER, *Primary Examiner.*

CHARLES A. RUEHL, *Assistant Examiner.*